United States Patent [19]

Kinoshita et al.

[11] Patent Number: 4,527,053
[45] Date of Patent: Jul. 2, 1985

[54] FOCUS DETECTING DEVICE WITH RELATIVE MOVEMENT DETECTION

[75] Inventors: Takao Kinoshita, Tokyo; Kazuya Hosoe, Kunitachi, both of Japan

[73] Assignee: Canon Kabushiki Kaisha, Tokyo, Japan

[21] Appl. No.: 390,023

[22] Filed: Jun. 18, 1982

[30] Foreign Application Priority Data

Jun. 30, 1981 [JP] Japan .................. 56-102013

[51] Int. Cl.³ .............................................. G01J 1/20
[52] U.S. Cl. .................................... 250/201; 354/406
[58] Field of Search ................ 250/201, 204, 578; 354/402–409

[56] References Cited

U.S. PATENT DOCUMENTS 4,218,119 8/1980 Schickedanz ................ 354/23
4,264,161 4/1981 Hosoe et al. .................. 354/31
4,341,953 7/1982 Sakai et al. .................... 250/201

Primary Examiner—David C. Nelms
Attorney, Agent, or Firm—Fitzpatrick, Cella, Harper & Scinto

[57] ABSTRACT

This specification discloses a detecting device provided with means for receiving radiation coming from an object and producing an electrical signal related thereto, focus detecting means for processing the produced electrical signal and producing a focus discrimination or determination signal, the detecting means forming a focus related or parametric signal in the course of the processing of the electrical signal, and relative movement detecting means coupled to the focus detecting means to detect the relative movement between the object and the device on the basis of the focus related or parametric signal.

16 Claims, 9 Drawing Figures

FOCUS DETECTING DEVICE WITH RELATIVE MOVEMENT DETECTION

BACKGROUND OF THE INVENTION

1. Field of the Invention

This invention relates to a detecting device, and more particularly to a detecting device provided with functions of detecting the focus and detecting the relative movement between an object and the detecting device.

2. Description of the Prior Art

For example, in instruments such as cameras, much importance is attached to the detection of the focus and the detection of the relative movement between an object and the camera to obtain better photographs. That is, the former is useful to always obtain the best imaging condition of the object image on the film surface, or in other words, to always obtain a sharp photograph, and the latter is useful to always obtain a photograph free of image blur on the film surface. Particularly, as regards the latter, a concrete form of output is possible in which whether the selected film exposure time (shutter speed) is sufficiently short to avoid image blur is determined, whereby in an inconvenient case, namely, in a case where the selected film exposure time is too long to avoid image blur, some warning to that effect is effected or photography (shutter release) is automatically inhibited and further the exposure time is automatically shifted to a short time.

Devices for effecting such focus detection and relative movement detection are known. For example, in U.S. Pat. No. 4,218,119 owned by the same assignee of the present invention ("System For Controlling The Exposure In A Camera", Schickedanz, patented on Aug. 19, 1980; corresponding German DE-OS No. 2738804) or U.S. Pat. No. 4,264,161 ("Motion Detecting Device In Exposure Control System For Optical Instruments", Hosoe et al., patented on Apr. 28, 1981; corresponding German DE-OS No. 2844339), a detecting device utilizing the output of a light detecting means to effect both detection of the focus and detection of relative movement is disclosed as a highly rational form of such device.

In these disclosed devices, there is still room for improvement. For example, by achieving not only a combined use of the light detecting means but also a great combined use of the signal processing circuit, it would be possible to simplify the construction of the electric circuit system and thereby greatly reduce the cost of the device, in spite of the device being provided with different functions.

SUMMARY OF THE INVENTION

In view of the above-noted situations, it is a primary object of the present invention to provide, as a detecting device which effects detection of the focus and detection of relative movement between an object and the device, an advantageous form of the device which, in spite of having such different functions, permits simplification and reduction in size of the electric circuit system and accordingly great reduction in the cost of the device, thereby further enhancing the readiness with which the device can be realized against various obstacles.

It is another object of the present invention to achieve a great combined use of not only the means for producing an electrical signal in response to radiation coming from an object but also the electric circuit for processing the electrical signal for said detection, thereby achieving the simplification and compactness of the construction of the entire electric circuit system and great reduction in the cost of the device.

For such objects, according to the present invention, there is provided a detecting device provided with means for receiving radiation coming from an object and producing an electrical signal related thereto, focus detecting means for processing the produced electrical signal and producing a focus discrimination or determination signal, the detecting means forming a focus related or parametric signal in the course of the processing of the electrical signal, and relative movement detecting means coupled to the focus detecting means for detecting relative movement between the object and the device on the basis of the focus related or parametric signal.

For example, according to a preferred embodiment of the present invention which will hereinafter be described, there is shown a construction in which the electrical signal producing means is provided with at least three radiation receiving portions disposed at positions optically equivalent to positions in front of the predetermined focal plane of optical means whose focus is adjustable, at said plane and behind said plane, respectively, and the relative movement detecting means detects relative movement between the object and the device on the basis of a focus related or parametric signal formed during the processing of the produced signal from one receiving portion disposed at the position optically equivalent to said predetermined focal plane. Since a sharp image of the object is formed on said predetermined focal plane by adjustment of the focus of the optical means, detecting the movement of the image on said predetermined focal plane as described above enables the relative movement between the object and the device to be detected more precisely. Incidentally, the two receiving portions disposed at the positions optically equivalent to the positions in front of and behind the predetermined focal plane are essential to discriminate the direction of the focus in TTL (Through The Lens) type focus detection, namely, to discriminate between near focus and far focus. Of course, the focus detecting means effects focus detection on the basis of focus related or parametric signals obtained by processing the produced signals from said three receiving portions.

In connection with what has been described above, detection of the relative movement should preferably be effected after completion of focus adjustment. This is because, with in-focus condition having been obtained, the sharpest image of the object is formed on the predetermined focal plane and accordingly, this condition is most preferable in effecting detection of the movement of the image more precisely.

Also, according to one aspect of the invention, detection of said relative movement is accomplished by evaluating the difference between at least two focus related or parametric signals formed at different points of time. In that case, to eliminate particularly the possibility of a wrong detection resulting from any fluctuation of the brightness of the object, it is useful to regularize the difference between said at least two signals by utilizing the focus related or parametric signals, or in other words, regularize the fluctuation by utilizing the information on the brightness of the object.

Other objects and features of the present invention will become apparent from the following detailed description of an embodiment thereof taken in conjunction with the accompanying drawings.

DESCRIPTION OF THE PREFERRED EMBODIMENT

Referring first to FIG. 1, it shows a separating optical system in which, in effecting focus detection by the use of the signals from three light receiving portions (radiation receiving portions), the three light receiving portions are disposed on the same substrate, two of the three light receiving portions being disposed optically before and behind the predetermined focal plane of a focusing lens and the remaining one light receiving portion being disposed on or near said predetermined focal plane, and a light beam is directed thereonto as shown.

Figure 1A:
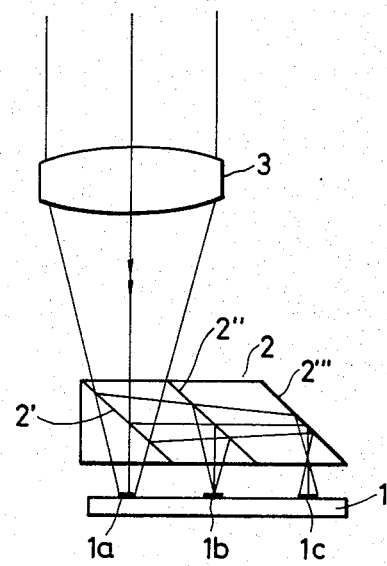
FIGS. 1A and 1B are schematic views for illustrating an example of the focus detecting system applicable to the present invention, FIG. 1A showing the arrangement and construction of the optical system and FIG. 1B showing photoelectric conversion means (radiation receiving means).
Figure 1B:
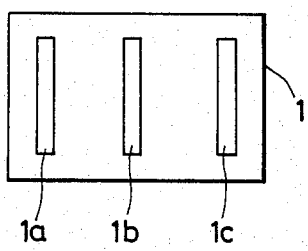

FIG. 1A shows an example in which three light receiving portions 1a, 1b and 1c are disposed on a substrate 1 such as ceramic or the like in a manner as shown in the top plane view of FIG. 1B and a separating optical system 2 is disposed thereon. Reference numeral 2' designates a half-transmitting portion in which the ratio of reflection factor and transmission factor is about 2:1, reference numeral 2'' denotes a half-transmitting portion in which the ratio of reflection factor and transmission factor is about 1:1, and reference numeral 2''' designates a total reflection portion. The incident light beam from an imaging optical system 3 is separated between the portions 2', 2'' and 2''' and is given a light path difference and enters the light receiving portions 1a, 1b and 1c and thus, the light receiving portions 1a–1c are as if they were disposed in equidistant optical positional relation along the optical axis of the imaging optical system 3.

The substrate 1 has been described as ceramic, but of course, a substrate 1 comprising a silicon wafer on or in which light receiving portions 1a, 1b and 1c are monolithically formed may be employed and particularly, a solid state image pickup device which has been remarkably advanced in recent years is also suitable.

Figure 2:
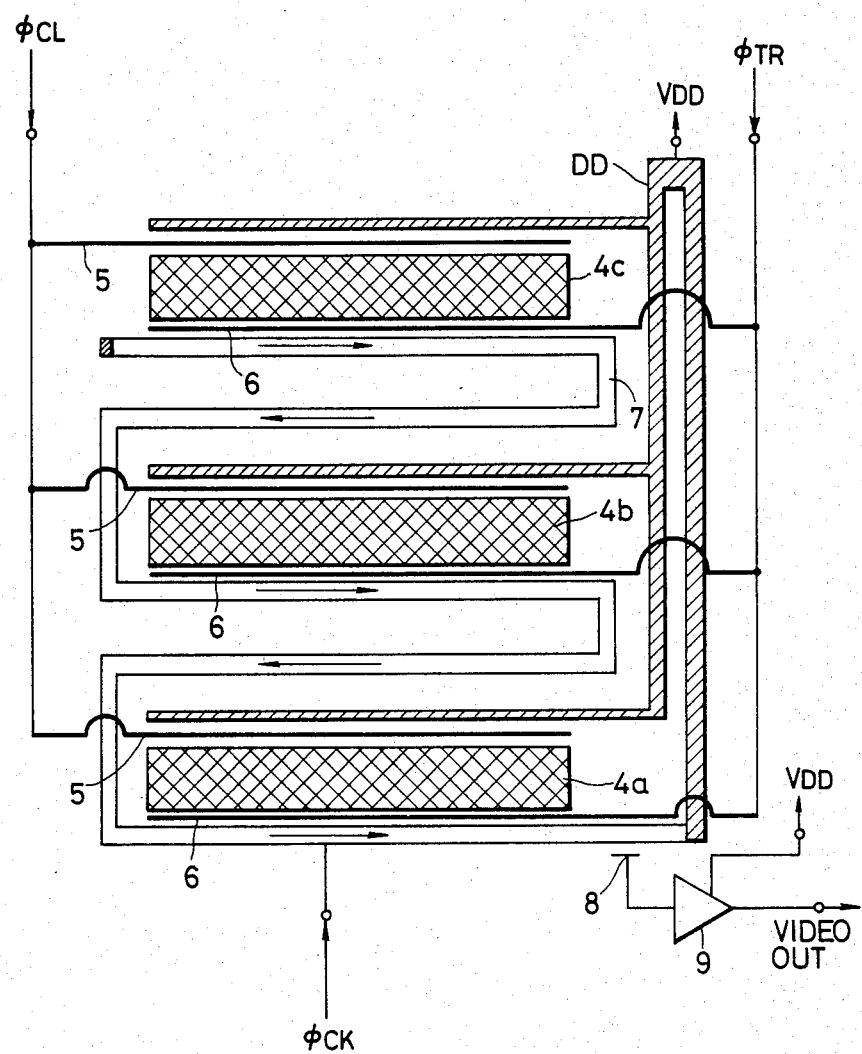
FIG. 2 is a schematic view showing the structure of the photoelectric conversion means (radiation receiving means).

FIG. 2 shows a charge transfer type solid state image pickup device as the radiation receiving means suitable for use in an embodiment of the present invention, and an embodiment of the present invention using a solid state image pickup device will hereinafter be described on the basis of this example. In the present invention, the aptitude thereof is not restricted to such a charge transfer type solid state image pickup device, but MOS image sensor or the like is also sufficiently applicable. In FIG. 2, reference numerals 4a, 4b and 4c designate light receiving portions each comprising a one-dimensional array of a plurality of tiny photoelectric conversion elements and having a well-known charge accumulating action, and it is to be understood that these are monolithically formed on a silicon chip at suitable intervals with various portions which will hereinafter be described.

The size of the individual photoelectric conversion elements in the light receiving portions 4a, 4b and 4c is of the order of $30\mu \times 50\mu$ and the number of elements in each light receiving portion 4a, 4b, 4c is not particularly limited, but it is, for example, of the order of 100 or 200. Designated by 5 is an accumulation clear gate for temporally eliminating an unnecessary charge stored in each element during non-use into a charge discharge drain DD to which a voltage $V_{DD}$ is applied, prior to the accumulation of signal charges, and said function is achieved by the gate 5 being opened when pulse indicated by $\phi$CL is imparted to one end of the gate 5. When the elimination of the unnecessary charge is terminated with the accumulation clear gate 5 remaining opened for a predetermined time, the gate 5 is closed again and accumulation of signal charges corresponding to the respective incident light signals is started in the individual photoelectric conversion elements in the light receiving portions 4a, 4b and 4c. Designated by 6 is a charge transfer gate for transferring the signal charges to an analog shift register 7 such as CCD taking, for example, the form of a serpentine structure after said signal charges have been accumulated for a predetermined time. The charge transfer gate 6 is operated by pulse indicated by $\phi$TR. The signal charge of each photoelectric conversion element transferred to the analog shift register 7 is transferred by pulse indicated by $\phi$CK as shown by an arrow in the figure. The transferred charge is converted into a voltage by a floating gate 8 having a well-known construction and is put out through an amplifier 9. A voltage indicated by VDD is applied to the amplifier 9. The charge which has passed below the floating gate 8 is caused to disappear by VDD.

When the charge transfer gate 6 is closed, the accumulation clear gate 5 is opened again and in a predetermined time, it is closed again, whereupon accumulation of the signal charges is started and, after a predetermined accumulation time has elapsed, the charge transfer gate 6 acts to transfer to the analog shift register 7 the charges accumulated in the individual photoelectric conversion elements in the light receiving portions 4a–4c. This cycle is repeated, whereby the image signals of the photoelectric conversion element groups are cyclically put out at the output end in a predetermined order.

Figure 3:
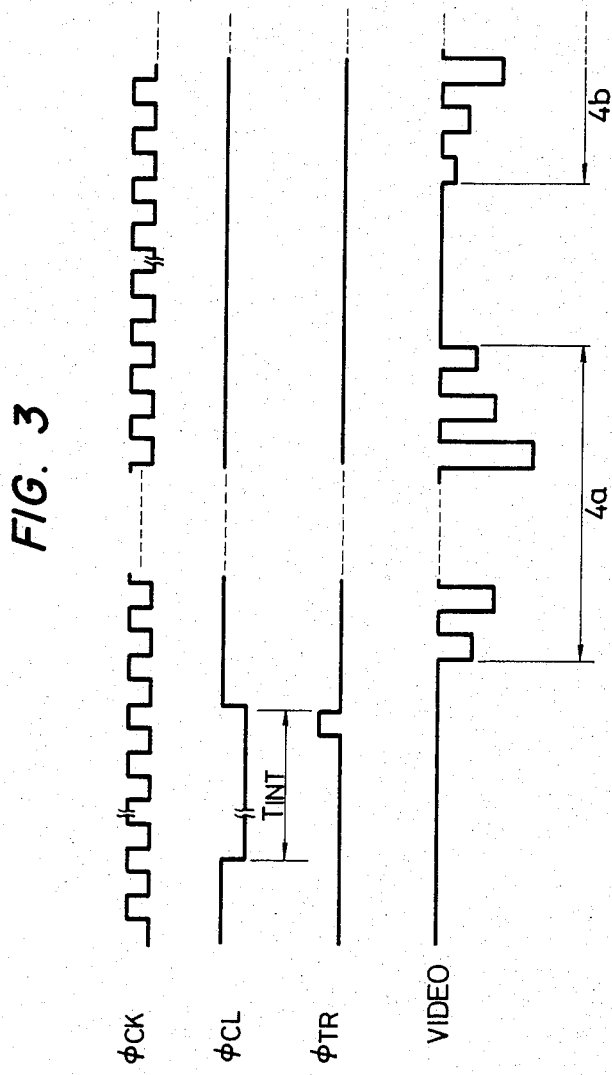
FIG. 3 is a timing chart showing the manner of operation of the photoelectric conversion means (radiation receiving means) shown in FIG. 2.

FIG. 3 shows the time relation in one scanning period of each clock pulse $\phi$CK, $\phi$CL, $\phi$TR and image signal (video output). As shown, pulse $\phi$CK is imparted at all times and at a certain timing, pulse $\phi$CL assumes low level, and at the end of the low level of $\phi$CL, pulse $\phi$TR is imparted. Accordingly, the charge accumulation time is given by the time interval $I_{INT}$ from the point of time whereat pulse φCL falls till the point of time whereat pulse φTR falls. After pulse φTR has been imparted, the image signal of the light receiving portion 4a is first put out. This is indicated by Video in the figure. When the reading of the signal of the light receiving portion 4a is terminated, the image signal of the next light receiving portion 4b is read out through a no-signal period determined by the length of the analog shift register 7. When this signal is terminated, the reading of the light receiving portion 4c, although not shown in FIG. 3, is effected through a similar no-signal period and thus, the reading of three image signals for one time is terminated. The above-described operation is repeated, whereby image signals are put out in succession, and the length of each cycle is determined by the length of the above-mentioned accumulation time $T_{INT}$.

Figure 4:
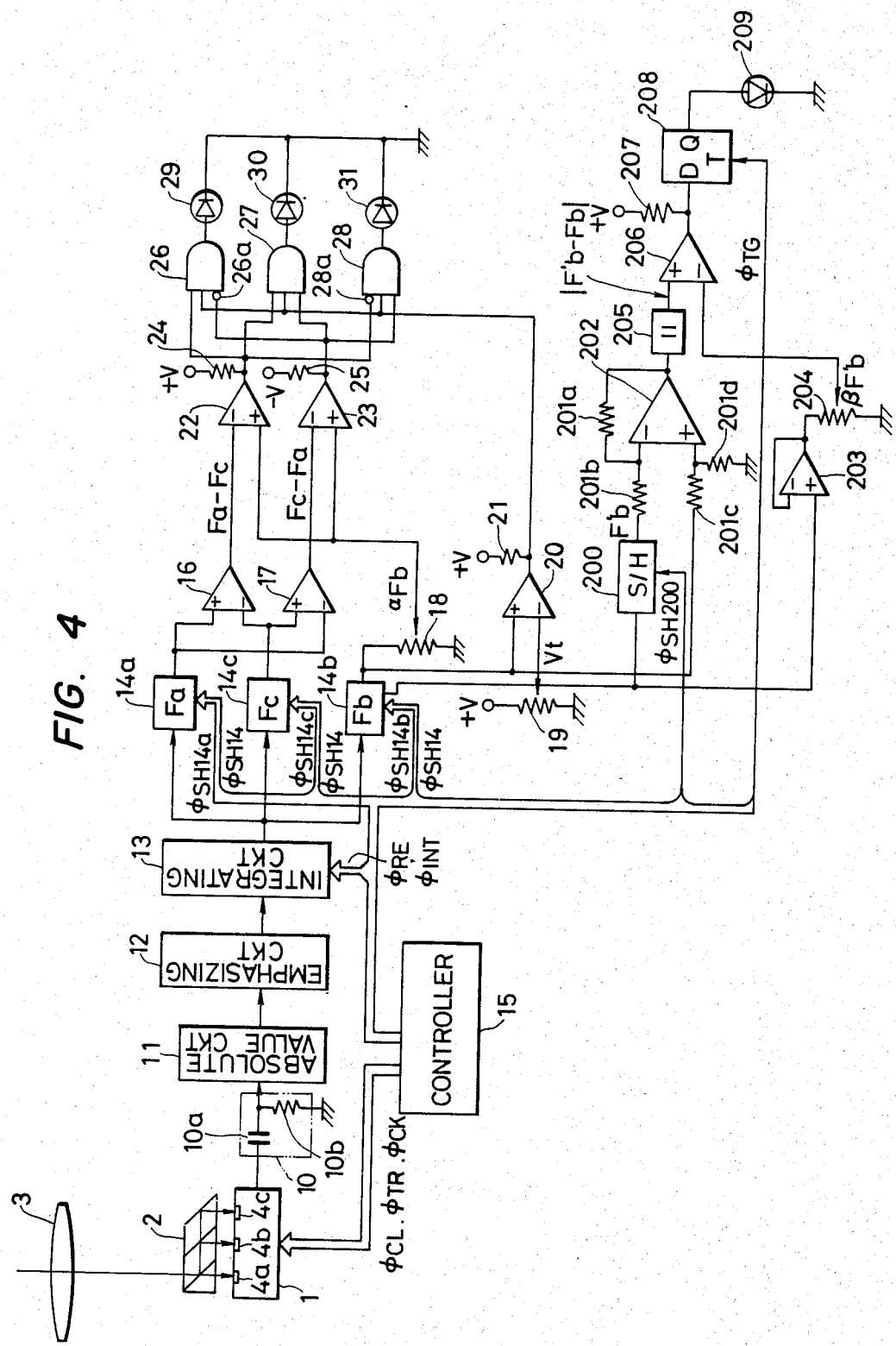
FIG. 4 is a circuit diagram showing the construction of the electric circuit system in an embodiment of the present invention.

FIG. 4 shows the circuit construction of an embodiment of the detecting device of the present invention using the solid state image pickup device shown in FIG. 2.

Reference numeral 3 designates an imaging lens whose focus is adjustable, reference numeral 2 denotes the aforementioned separating optical system, and reference numeral 1 generally designates the solid state image pickup device shown in FIG. 2. The output of the solid state image pickup device 1, namely, the image signal of three images, is directed to a high-pass filter 10 comprising a capacitor 10a and a resistor 10b, and the varied portion of the image signal is extracted in the high-pass filter 10, whereafter it is rendered into an absolute value by an absolute value circuit 11. Designated by 12 is an emphasizing circuit for emphasizing the absolute value signal of the varied portion in accordance with the level thereof. The emphasizing circuit 12 further emphasizes the absolute value signal level which becomes greater as the sharpness of the image is higher, while it serves to suppress the absolute value signal of a small level when the sharpness of the image has been reduced, and this can be easily realized by utilizing, for example, the non-linearity of the input and output of FET element. Thus, the output level of the emphasizing circuit 12 reflects the sharpness of the image very sharply.

Figure 5A:
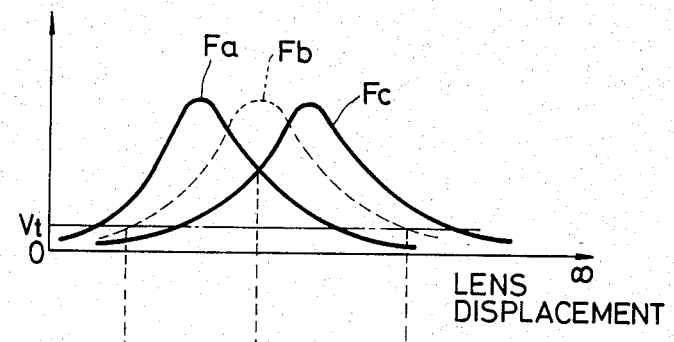
FIGS. 5A and 5B are output waveform graphs for illustrating the manner of determining the focus in the circuit system shown in FIG. 4.

Designated by 13 is an integrating circuit for integrating the emphasizing signal from the emphasizing circuit 12 corresponding to each light receiving portion 4a, 4b, 4c. Thus, the output of the integrating circuit 13 is the focus related or parametric signal of each of said images. Reference numerals 14a, 14b and 14c designate sample hold circuits for holding the focus related or parametric signals of the images on the three light receiving portions 4a, 4b and 4c of FIG. 2 until the next cycle is reached. The sample hold circuit 14a sample-holds the focus related or parametric signal corresponding to the light receiving portion 4a, the sample hold circuit 14b sample-holds the focus related or parametric signal corresponding to the light receiving portion 4b, and the sample hold circuit 14c sample-holds the focus related or parametric signal corresponding to the light receiving portion 4c. These sample hold circuits 14a-14c can be realized by using well-known sample hold circuits in two serial stages, and can sample-hold the three focus related or parametric signals alternating little by little in a time-serial fashion at the respective fore stage circuits, whereafter they are transferred to the respective rear stage circuits in synchronism with each other, whereby the outputs of the sample hold circuits can be changed into new signals at a time. Thus, the variations in the outputs of the sample hold circuits 14a, 14b and 14c when the imaging lens 3 is adjusted are as shown in FIG. 5A. For simplicity of description, the output of the sample hold circuit 14a is defined as Fa, the output of the sample hold circuit 14b is defined as Fb, and the output of the sample hold circuit 14c is defined as Fc. Designated by 15 is a controller for controlling the image pickup device 1 and circuits 13, 14a, 14b, 14c, 200 and 208 (circuits 200 and 208 will hereinafter be described) on the basis of a predetermined timing, and for example, pulses φCL, φTR and φCK are imparted to the solid state image pickup device 1, integration reset pulse and integration instructing pulse are imparted to the integrating circuit 13, sampling pulse is imparted to the sample hold circuits 14a, 14b, 14c and circuit 200, and latch pulse is imparted to the latch circuit 208. The timing of each of these pulses is effected in a predetermined order, and the accumulation, shift and transfer of the charge in the solid state image pickup device 1, the integration and sample hold of the signals subjected to each processing thereafter, and the latch of the result of comparison are carried out. Reference numerals 16 and 17 designate differential amplifier circuits for obtaining Fa-Fc and Fc-Fa, respectively, and reference numeral 18 denotes a variable resistor which gives a suitable attenuation to the output of the sample hold circuit 14b, i.e., Fb, the output of the voltage dividing point thereof being given by αFb ($\alpha<1$). Designated by 20 is a comparator for comparing a reference voltage Vt determined by a variable resistor 19 with the output of the sample hold circuit 14b, i.e., Fb. Reference numeral 21 denotes a pull-up resistor. The reference voltage Vt determined by the variable resistor 19 serves to inhibit the output of the focus detection result when the output of Fb is very small, or in other words, in a remarkable defocused condition. The output of the comparator 20 becomes high when Fb>Vt, and becomes low when Fb<Vt, i.e., in a remarkable defocused condition. Reference numeral 22 designates a comparator which compares the output Fa-Fc of the differential amplifier 16 with αFb, and reference numeral 23 designates a comparator which compares the output Fc-Fa of the differential amplifier 17 with αFb. Denoted by 24 and 25 are pull-up resistors. The detectable range of the correct in-focus position can be made variable by rendering said α variable. Reference is now had to FIG. 5 to describe the operation in which display is effected by such a construction and discrimination between in-focus, near focus and far focus is effected.

Figure 5B:
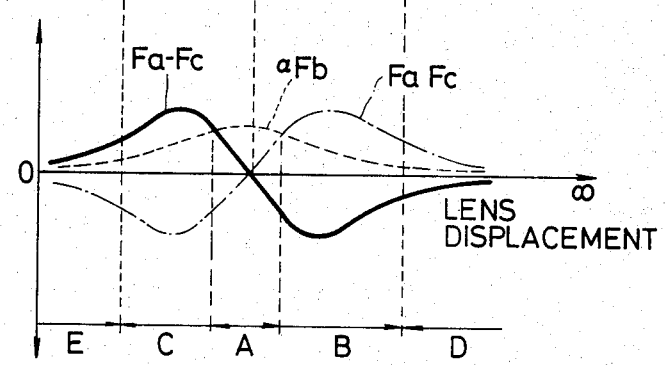

FIG. 5A shows the relations between the position of the imaging lens 3 and Fa, Fb, Fc, with respect to an object lying at a predetermined distance, and FIG. 5B shows the relations between the position of the lens 3 and αFb, Fa-Fc, −(Fa-Fc) obtained by subjecting Fa, Fb and Fc to said processing. In the area A of FIG. 5B, namely, in the proper infocus range, αFb>Fa-Fc and αFb>−(Fa-Fc) and Fb>Vt and therefore, the outputs of comparators 22, 23 and 20 all become high and accordingly the output of an AND gate 27 becomes high, and therefore, LED 30 is turned on, whereby in-focus is displayed. In the case of the area B, namely, in the case of far focus, αFb>Fa-Fc, αFb<−(Fa-Fc) and Fb>Vt, whereby the outputs of the comparators 22 and 20 become high and the output of the comparator 23 becomes low and accordingly, the output of an AND gate 26 becomes high, so that LED 29 is turned on.

Conversely, in the case of the area C, namely, in the case of near focus, $\alpha Fb < Fa-Fc$, $\alpha Fb > -(Fa-Fc)$ and $Fb > Vt$, whereby the outputs of the comparators 23 and 20 become high and the output of the comparator 22 becomes low and accordingly, the output of an AND gate 28 becomes high, so that LED 31 is turned on. Reference numeral 26a designates the input inverter of an AND gate 26, and reference numeral 28a denotes the input inverter of the AND gate 28. Thus, discrimination between in-focus and out-of-focus can be effected and in the case of out-of-focus, in which direction the lens position is deviated with respect to the proper in-focus position can be recognized from the turn-on-and-off of LED's 29-31. In the case of the area D or E, Vt is set so that $Fb < Vt$, whereby in this area, the output of the comparator 20 becomes low and accordingly, the outputs of the AND gates 26-28 all become low, so that LED's 29-31 are all turned off to enable a remarkable defocused condition to be recognized. If the value of $\alpha$ is adjusted, the area A is narrowed to enable in-focus position detection of high accuracy or, by slightly widening the area A, quick in-focus position detection becomes possible although the accuracy thereof is reduced.

Detection of blur will now be described in detail. In FIG. 4, a focus related or parametric signal Fb formed on the basis of the signal from the light receiving portion 4b located at a position on the solid state image pickup device 1 which is optically equivalent to the predetermined focal plane of the lens 3 is stored in the sample hold circuit 14b, and this signal Fb, with a similar focus related or parametric signal F'b after one cycle which is stored in the sample hold circuit 200, is imparted to a differential amplifier comprising resistors 201a-201d and an operational amplifier 202, whereby the difference between the two signals is detected. In this case, the sample hold circuit 200 is connected so as to sample-hold the value held by the fore stage sample hold portion of the sample hold circuit 14b (as previously described, each of the sample hold circuits 14a-14c is of a two-stage construction). The difference output of the above-mentioned differential amplifier is made into an absolute value by a generally known absolute value circuit 205. On the other hand, the focus related or parametric signal F'b is impedance-converted by a buffer 203, whose output voltage is suitably divided by a variable resistor 204 and converted into $\beta F'b (\beta < 1)$. A comparator 206 compares the absolute value signal $|Fb-F'b|$ with this $\beta F'b$.

By such circuit construction, comparison is made between the magnitudes of "the variation $|Fb-F'b|$ of the focus related or parametric signal during one sequence" and "the focus related or parametric signal $F'b \times \beta$, or in other words, $$\frac{\text{(variation of focus related or parametric signal during one sequence)}}{\text{(focus related or parametric signal)}} \gtrless \frac{1}{\beta}$$

This shows the value of relative variation of the focus related or parametric signal Fb which does not depend much on the brightness or contrast of the object to be photographed.

Movement of the object to be photographed or blur of the camera can be directly observed as a focus related or parametric signal fluctuation and therefore, it leads to blur photography that the output of the comparator 206 becomes high.

The output of this comparator 206 is latched at a predetermined timing by a latch circuit (D-flip-flop) 208 which responds to the control signal from the controller 15, and LED 209 is controlled by the output of this latch circuit 208 to warn the photographer of blur photography. Reference numeral 207 designates a pull-up resistor.

Figure 6:
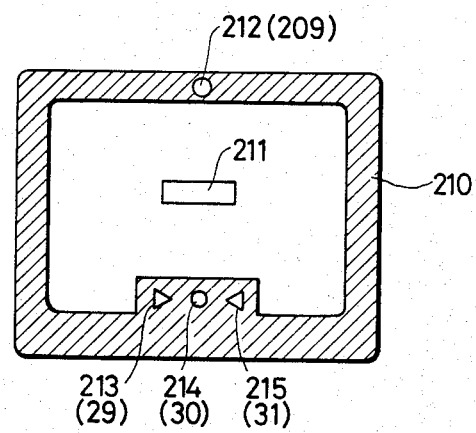
FIG. 6 is a schematic view showing an example of the display of the output of the FIG. 4 circuit system within the viewfinder of a camera.

LED 209 may be disposed in the upper portion within the viewfinder of the camera as indicated at 212 in FIG. 6, but of course this is not restrictive. Of course, means of warning is not restricted to LED display, but warning by sound or the like would also be effective.

In FIG. 6, reference numeral 210 designates the viewfinder frame of the camera, reference numeral 211 denotes a mark showing the detection view field for the detection of the focus and blur of the device of the embodiment hitherto described, and reference numerals 213, 214 and 215 designate marks for indicating the far focus, in-focus and near focus which are the results of the focus detection. LED 29 of FIG. 4 is disposed behind the mark 213, LED 30 is disposed behind the mark 214, and LED 31 is disposed behind the mark 215. By LED's 29, 30 and 31 being turned on, the marks 213, 214 and 215 corresponding thereto are illuminated and each condition of the focus adjustment is displayed within the viewfinder by the difference in position between the marks 213, 214, 215 chiefly at this time. Incidentally, in this case, it will be more advantageous if, particularly, the marks 213 and 215 for displaying far focus and near focus are designed to display the direction of operation (rotation) of the focusing ring required to bring the picture-taking lens from each out-of-focus condition, i.e., far focus or near focus condition into in-focus condition. It will also be advantageous if the colors of the lights emitted from LED 30, LED 29 and LED 31 are made to differ from each other, for example, green and red.

Figure 7:
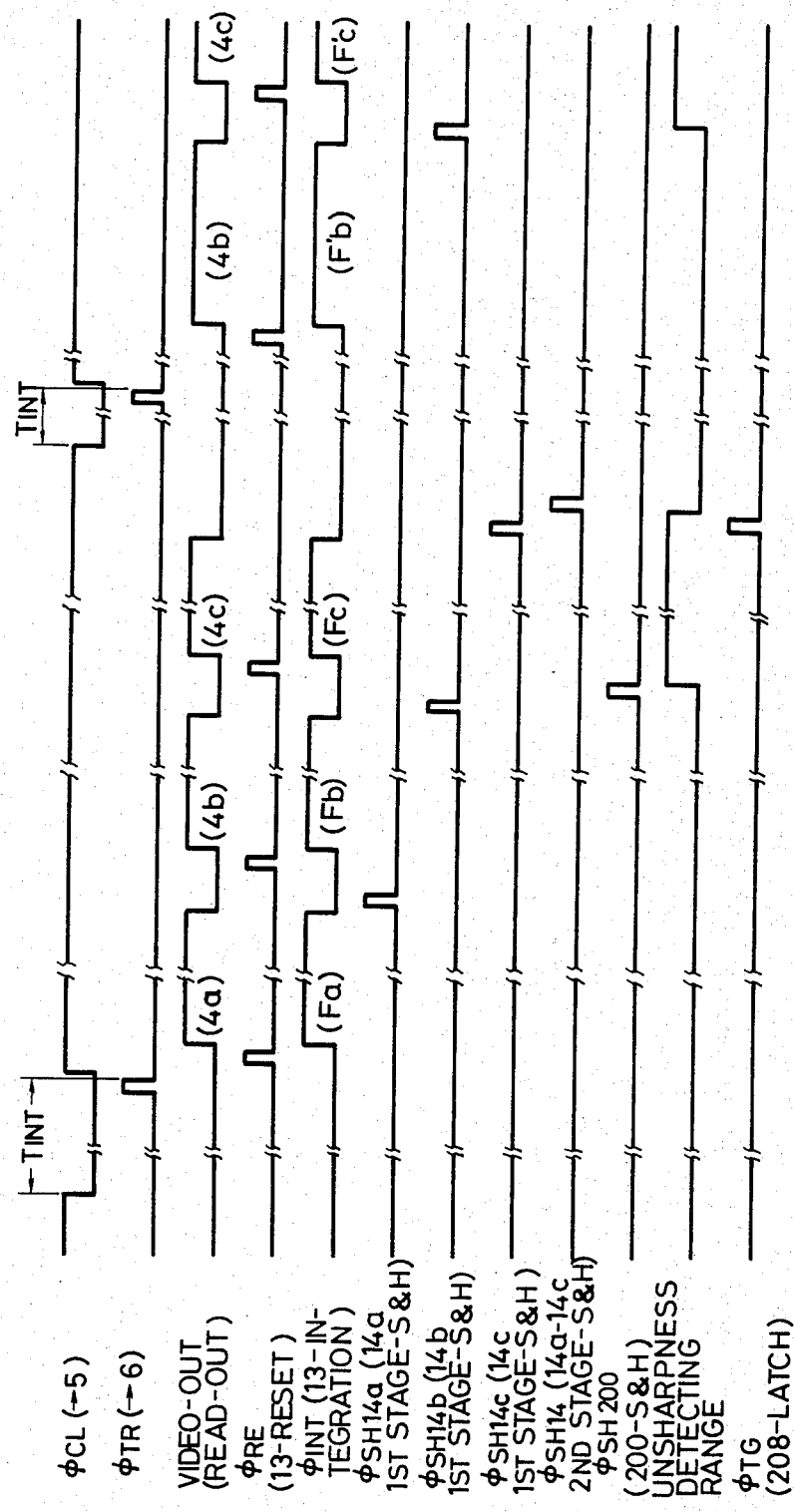
FIG. 7 is a timing chart showing various control pulses put out from the controller in the FIG. 4 circuit system to various circuit portions.

Reference is now had to FIG. 7 to describe various control signals imparted from the controller 15 to the image pickup device 1 and the circuits 13, 14a-14c, 200 and 208 during the above-described focus detection and the detection of image blur (relative movement).

In FIG. 7, $\phi CL$, as already noted, is an integration clear pulse imparted to the integration clear gate 5 (FIG. 2) of the image pickup device 1, and by the high of this pulse $\phi CL$, the generated charges in the light receiving portions 4a-4c are cleared and by the low of this pulse $\phi CL$, accumulation of the generated charges becomes possible. $\phi TR$ is a charge shift pulse imparted to the charge shift gate 6 (FIG. 2) of the image pickup device 1, and by the high of this pulse, the accumulated charges in the light receiving portions 4a-4c are shifted to the analog shift register 7 through the gate 6 and transferred to the output amplifier 9 through the register 7 (therefore, pulse $\phi CK$ shown in FIG. 3 is imparted to the register 7), and converted into a voltage by the amplifier 9 and put out as Video OUT. In FIG. 7, the time zones for reading out the signals from the light receiving portions 4a, 4b, 4c are shown just below the pulse $\phi TR$. $\phi RE$ is a reset pulse imparted to the integrating circuit 13 and this is put out from the controller 15 prior to the read-out of the signals from the light receiving portions 4a, 4b, 4c, in preparation for the integration of the output of the emphasizing circuit 12 in each light receiving portion 4a, 4b, 4c during the read-out of the signals from the light receiving portions 4a, 4b, 4c. $\phi INT$ is an integration instructing pulse imparted to the integrating circuit 13, and individual pulses become high correspondingly to the time zones for reading out the signals from the light receiving portions 4a, 4b, 4c, whereby in the integrating circuit 13, integration of the output of the emphasizing circuit 12 is effected for each light receiving portion 4a, 4b, 4c. By this, the above-described focus related or parametric signals Fa, Fb and Fc are formed in the integrating circuit 13. φSH14a, φSH14b and φSH14c are sampling pulses individually imparted to the fore stages of the sample hold circuits 14a-14c to cause the focus related or parametric signals Fa, Fb, Fc thus formed by the integrating circuit 13 to be individually held in the sample hold portions of the fore stages of the sample hold circuits 14a-14c (as described above, the sample hold circuits 14a-14c are of a two-stage construction), and all of these sampling pulses are put out from the controller 15 immediately after termination of the integrating operation (for each light receiving portion 4a, 4b, 4c) of the integrating circuit 13 and moreover before the integrated values (Fa, Fb, Fc) thereof are reset (before reset pulse φRE is generated). φSH14 is a sampling pulse concurrently imparted to the rear stages of the sample hold circuits 14a-14c to shift the values held in the sample hold portions of the fore stages of the sample hold circuits 14a-14c toward the sample hold portions of the rear stages, and this is put out from the controller 15 immediately after the focus related or parametric signal Fc formed by the integrating circuit 13 has been held by the fore stage of the sample hold circuit 14c. Thus, at a point of time whereat the values hitherto held in the rear stages of the sample hold circuits 14a-14c have been rewritten into new values held in the fore stages by the sampling pulse φSH14, new determination of the focus adjusted condition is effected on the basis of this new data (focus related or parametric signal) by a focus discriminating circuit system comprising elements 16-28 and the result thereof is displayed by LED's 29-31.

Now, on the other hand, in FIG. 7, φSH200 is a sampling pulse imparted to the sample hold circuit 200 to cause the value held in the sample hold portion of the fore stage of the sample hold circuit 14b to be held in the sample hold circuit 200, and this is put out from the controller 15 immediately after the output (Fb) of the integrating circuit 13 corresponding to the light receiving portion 4b has been held in the fore stage of the sample hold circuit 14b, namely, immediately after the falling of the sampling pulse φSH14b. Thus, at the point of time whereat the value held in the fore stage of the sample hold circuit 14b has been held by the sample hold circuit 200, apart from a case where the data before one cycle is not held in the rear stage of the sample hold circuit 14b, in a case where the data before one cycle is held therein, detection of relative movement is effected in the described manner at that point of time by a relative movement detecting circuit system comprising elements 201-207. That is, this detection is effected by discriminating the magnitude of |Fb-F'b| with respect to βF'b when F'b is the new data held in the sample hold circuit 200 and Fb is the old data before one cycle held in the rear stage of the sample hold circuit 14b. Accordingly, the time zone during which this relative movement detection (image blur detection) is effected is, as shown just below the pulse φSH200, the time zone from after the data (F'b) has been held in the sample hold circuit 200 by the pulse φSH200 until the value (Fb) held in the rear stage of the sample hold circuit 14b is rewritten into new data (F'b) by the pulse φSH14. As can be seen from this, at the point of time of pulse φSH200 in the first operation cycle of the device, no data is held in the rear stage of the sample hold circuit 14b and therefore, detection of relative movement is impossible and after all, detection becomes possible in the second and subsequent operation cycles. Incidentally, the device repeats its operation as long as the operation instruction is imparted (usually this is imparted to the controller 15) by unshown means, and the period of the operation cycle in this case is in the range of 100 m sec.-400 m sec. although it differs depending on the accumulation time $T_{INT}$ of the signal charge in the image pickup device 1. φTG is a trigger pulse imparted to the latch circuit 208 to latch the output of the comparator 206 by the latch circuit 208, and this is put out from the controller 15 in the vicinity of the end of the above-described relative movement detection time zone (particularly before the pulse φSH14). As described above, LED 209 is controlled by the output of the latch circuit 208, whereby warning of image blur is given.

The controller 15, the detailed construction of which is not shown, governs the control of various circuit portions by the above-described control pulses, and may be suitably constructed by utilizing a well-known pulse counter, logic gate, flip-flop, etc. The concrete construction of such controller will be readily apparent to those skilled in the art, but it may be readily obtained by modifying, as required, the construction of the sequence control circuit disclosed particularly in FIG. 6 of each of U.S. patent applications Ser. Nos. 310,483 filed on Oct. 9, 1981; 313,578, 313,579, 313,582, 313,583, 313,584 and 313,599 all filed on Oct. 21, 1981 (corresponding German patent applications Nos. P3141182.7, P3141991.7, P3141992.5, P3141937.2, P3142000.1, P3141959.3 and P3141936.4), of the same assignee of the subject application.

Now, in the above-described embodiment of the device, as regards the value of "β" set by the variable resistor 19 in the relative movement detecting system, it is useful in accomplishing more accurate relative movement detection to make such a design that, for example, in a camera or the like, the value of β is automatically adjusted so that it becomes smaller as exposure time becomes longer in accordance, preferably, with the selected shutter speed (in the case of a shutter priority type AE-automatic exposure-camera) or the shutter speed calculated by the exposure operating circuit (in the case of an aperture priority type AE camera). Further, even in a case where the signal accumulation time in the image pickup device 1 is made variable, it is also effective to make such a design that the value of β is automatically adjusted so that it becomes smaller as said signal accumulation time is longer.

In the illustrated embodiment, the means for displaying the result of the relative movement detection has been restricted to light or sound, but in a camera, for example, design may be made such that the shutter speed, i.e., the exposure time, is automatically controlled in accordance with the result of the detection and in that case, utilization may be made of the circuit construction as disclosed in the aforementioned U.S. Pat. Nos. 4,218,119 and 4,264,161. Design may also be made such that the advisability of photography is automatically controlled by the result of the detection. Although not shown in the embodiment, the relative movement detection may be designed such that it becomes ENABLE only at a point of time whereat the in-focus condition of the lens 3 has been attained. This is because by the in-focus condition, the sharpest image of the object is formed on the predetermined focal plane of the lens 3, namely, on the light receiving portion 4b and accordingly, a condition best suited for image blur detection is brought about.

As described above, in the device of the present invention, the focus related or parametric signal formed by the focus detecting system is utilized to detect the relative movement between the object and the device, whereby in spite of the capability of performing entirely different functions of focus detection and relative movement detection, structural simplification and compactness of the device and great reduction in the cost thereof can be achieved, and this is very useful for the realization of the device of this type.

What we claim is:

1. A detecting device including:
   radiation receiving means for receiving radiation from an object and producing an electrical signal related thereto;
   focus detecting means for processing said electrical signal produced by said radiation receiving means and effecting detection of the focus, said focus detecting means forming focus related or parametric signals in the course of the processing of said electrical signal; and
   relative movement detecting means coupled to said focus detecting means for detecting relative movement between said object and said device by comparing at least one said focus related or parametric signal to a reference signal.

2. The device according to claim 1, further including:
   an imaging optical system whose focus is adjustable;
   said radiation receiving means being disposed to receive the radiation from said object through said optical system.

3. The device according to claim 2, wherein said imaging optical system has a predetermined focal plane on which a sharp image of said object is to be formed; said radiation receiving means has a plurality of radiation receiving portions, of which a first radiation receiving portion corresponds to a position optically substantially equivalent to said predetermined focal plane and produces an electrical signal related to the radiation received thereby, a second radiation receiving portion corresponds to a position optically substantially equivalent to a predetermined position forward of said predetermined focal plane and produces an electrical signal related to the radiation received thereby, a third radiation receiving portion corresponds to a position optically substantially equivalent to a predetermined position rearward of said predetermined focal plane and produces an electrical signal related to the radiation received thereby; and said focus detecting means processes the produced signals from said three radiation receiving portions and forms three focus related or parametric signals corresponding to said receiving portions and effects discrimination of the focus adjusted condition of said imaging optical system relative to said object on the basis of said signals.

4. The device according to claim 3, wherein said focus detecting means includes:
   an image sharpness detecting circuit for processing the produced signals from said three radiation receiving portions in said radiation receiving means and forming, as said three focus related or parametric signals, signals representative of the sharpness on said receiving portions of the image of said object formed by said imaging optical system; and
   a focus discriminating circuit for discriminating the focus adjusted condition of said imaging optical system with respect to said object on the basis of said three image sharpness signals formed by said image sharpness detecting circuit.

5. The device according to claim 3 or 4, wherein said relative movement detecting means is arranged to detect relative movement between said object and said device on the basis of the focus related or parametric signal corresponding to said first radiation receiving portion of said radiation receiving means.

6. The device according to claim 5, wherein said focus detecting means forms said focus related or parametric signals in cycles and said relative movement detecting means includes:
   a first circuit for detecting the fluctuation between two focus related or parametric signals obtained in different said operation cycles and for deriving said reference signal from one of said two signals; and
   a second circuit for comparing the fluctuation detected by said first circuit with said reference signal.

7. The device according to claim 2, wherein said focus detecting means includes:
   an image sharpness detecting circuit for processing the produced signal from said radiation receiving means and forming, as said focus related or parametric signal, a signal representative of the sharpness on said receiving means of the image of said object formed by said imaging optical system; and
   a focus discriminating circuit for discriminating the focus adjusted condition of said imaging optical system with respect to said object on the basis of said image sharpness signal formed by said image sharpness detecting circuit.

8. The device according to claim 2 or 7, wherein said focus detecting means forms said focus related or parametric signals in cycles and said relative movement detecting means includes:
   a first circuit for detecting the fluctuation between two focus related or parametric signals obtained in different said operation cycles and for deriving said reference signal from one of said two signals; and
   a second circuit for comparing the fluctuation detected by said first circuit with said reference signal.

9. The device according to claim 1, wherein said one focus related or parametric signal is produced in the focus condition.

10. The device according to claim 1, further including an imaging optical system having a predetermined focal plane on which a sharp image of said object is to be formed, wherein:
    said radiation receiving means includes a radiation receiving portion at a position optically substantially equivalent to said predetermined focal plane;
    said focus detecting means forms said focus related or parametric signals from signals produced by said radiation receiving portion in cycles; and
    said relative movement detecting means includes a first circuit for detecting the fluctuation between two focus related or parametric signals formed in different said operation cycles and a second circuit for comparing the fluctuation detected by said first circuit with said reference signal.

11. The device according to claim 1, wherein said reference signal is derived from a focus related or parametric signal formed by said focus detecting means.

12. The device according to claim 11, wherein said focus detecting means forms said focus related or parametric signals in cycles and said relative movement detecting means includes:
- a first circuit for detecting the fluctuation between two focus related or parametric signals obtained in different said operation cycles; and
- a second circuit for comparing the fluctuation detected by said first circuit with said reference signal.

13. The device according to claim 12, wherein said first circuit derives said reference signal from one of said two signals.

14. The device according to claim 11, wherein:
said focus detecting means forms said focus related or parametric signals from said electrical signals produced by said radiation receiving means in cycles; and
said relative movement detecting means includes a first circuit for detecting the fluctuation between two focus related or parametric signals formed in different said operation cycles and a second circuit for comparing the fluctuation detected by said first circuit with said reference signal.

15. A detecting device including:
radiation receiving means for receiving radiation from an object and producing an electrical signal related thereto;
focus detecting means for processing said electrical signal produced by said radiation receiving means and effecting detection of the focus, said focus detecting means forming in cycles focus related or parametric signals in the course of the processing of said electrical signal, and relative movement detecting means coupled to said focus detecting means for detecting relative movement between said object and said device comprising,
a first circuit for detecting the fluctuation between two focus related or parametric signals obtained in different said operation cycles; and
a second circuit for comparing the fluctuation detected by said first circuit with a reference signal.

16. The device according to claim 15, wherein said reference signal is derived from a focus related or parametric signal formed by said focus detecting means.

* * * * *